United States Patent [19]

Fox

[11] Patent Number: 4,586,666
[45] Date of Patent: May 6, 1986

[54] FOOD PROCESSOR

[76] Inventor: Michael Fox, 45 Murray St., Pyrmont, New South Wales, Australia

[21] Appl. No.: 585,991

[22] Filed: Mar. 2, 1984

[30] Foreign Application Priority Data

Mar. 2, 1983 [AU] Australia .................... PF8263

[51] Int. Cl.⁴ ............................................ B02C 18/12
[52] U.S. Cl. .............................. 241/282.2; 241/199.12
[58] Field of Search ................ 241/92, 282.1, 282.2, 241/37.5, 199.12

[56] References Cited

U.S. PATENT DOCUMENTS 3,606,178  9/1971  Klopp ..................... 241/282.1 X
4,194,697  3/1980  Lembeck ....................... 241/92

FOREIGN PATENT DOCUMENTS 1242334  1/1965  Fed. Rep. of Germany ... 241/282.1
2142213  1/1973  France ........................... 241/282.1

Primary Examiner—Howard N. Goldberg
Assistant Examiner—Timothy V. Eley
Attorney, Agent, or Firm—Michael J. Striker

[57] ABSTRACT

A food processor including, a base having an upper surface with an aperture therein, an electric driving mechanism, a first substantially cylindrical food processing container having an open upper end, an upper part and a bottom with a hole, a first lid provided so as to removably close the upper end of the first container, a mechanism for removably attaching the first container to the upper surface of the base so that the electric drive mechanism projects through the bottom hole of the first container, a first sleeve provided in the first container so as to surround the bottom hole and project upwardly to form a first annular liquid containing well, a second smaller container located in the upper part of the first container, and having a substantially smaller volumetric capacity than the first container in the base with a hole therein, a second sleeve provided in the second container so as to surround the base hole and project upwardly to form a second annular liquid containing well, a food processing tool provided in the second container so as to process food placed therein, a mechanism for driveably connecting the tool to the electric drive mechanism, and a second lid closely fittable on the second container.

11 Claims, 4 Drawing Figures

FOOD PROCESSOR

BACKGROUND OF THE INVENTION

The present invention relates to improvements in food processors of the kind consisting of a base containing an electric driving motor, an aperture in the upper surface of said base through which a driving shaft from said motor projects, a substantially cylindrical food processing container closed at its upper end by a removable lid, complementary means on said base and said container whereby said container is removably attached to the upper surface of said base with the driving motor shaft projecting through the hole in the base of the container, a sleeve in said container surrounding said hole and projecting upwardly into the container to form an annular liquid containing well around said hole.

Food processors of this kind are well known and are used for domestic food processing in large quantities. It has been found that the requirements of the market can be best met by designing a food processor so that the container is of a sufficient size to process relatively large quantities of foodstuffs at the same time. It has been found however that in some cases it is desired to process a number of different foodstuffs in relatively small quantities and in certain cases to store those small quantities for future use. The normal food processor of this kind is not well suited for this purpose as it is not as well adapted for the treatment of small quantities of foodstuffs as for larger quantities. Furthermore, after processing one foodstuff it is necessary to transfer it to another container for storage and then clean the container and the food processing tool before another foodstuff can be processed.

SUMMARY OF THE INVENTION

The object of the present invention is to provide an adjunct for a food processor of this kind which facilitates the processing of small quantities of foodstuffs and their subsequent storage.

The present invention resides in a food processor consisting of a base containing an electric driving motor, an aperture in the upper surface of said base through which a driving shaft from said motor projects, a substantially cylindrical food processing container closed at its upper end by a removable lid, complementary means on said base and said container whereby said container is removably attached to the upper surface of said base with the driving motor shaft projecting through a hole in the bottom of the container, a sleeve in said container surrounding said hole and projecting upwardly into the container to form an annular liquid containing well around said hole characterized in that there is provided within the upper part of the said container a second container of substantially smaller volumetric capacity, said second container having a hole in its base and a sleeve surrounding that hole and projecting upwardly to form an annular liquid containing well around that hole, a food processing tool in said second container arranged and consructed to process food placed therein, a driving connection between said tool and the driving motor shaft and a lid fitting closely on said second container. It is preferred that there be provided in addition to the lid referred to above for the small container an additional lid intended for storage purposes and arranged to engage frictionally around the periphery of the small container and around the upper end of the sleeve therein.

In order that the nature of the invention may be better understood, a preferred form thereof is hereinafter described by way of example, with reference to the accompanying drawings.

DETAILED DESCRIPTION OF THE PREFERRED EMBODIMENTS

Figure 1:
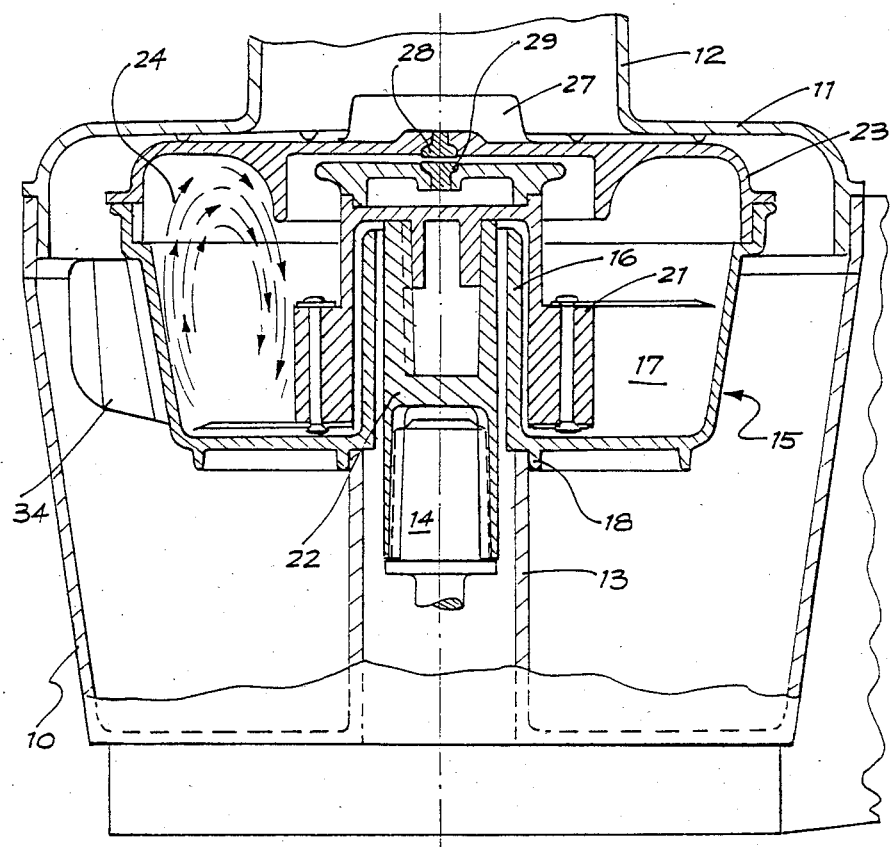
FIG. 1 shows a sectional elevation of a preferred form of the invention.

In FIG. 1 the outline of the container of a conventional food processor of the kind referred to is shown, the container being indicated at 10 and the lid thereof at 11, the lid being provided with a tube 12 through which food may be introduced into the container 10. Within the container 10 is a sleeve 13 and projecting upwardly from a motor contained in the base of the food processor (neither of which are shown) is a driving shaft 14.

The invention provides a small container 15 which as may be seen in FIG. 1 is of a very much smaller volumetric capacity than the container 10 but is consructed along similar lines, having a central sleeve 16 to form an annular liquid containing well 17. The small container 15 is provided on its underside with an inner annular shoulder 18 by means of which it is located on the upper end of the sleeve 13 of the container 10. Within the small container 15 is a food processing tool 21 which is of the general shape and configuration of a food processing tool as would normally be used in the large container 10. It is associated with a sleeve 22 which is in driving connection with the driving shaft 14 of the food processor.

Figure 2:
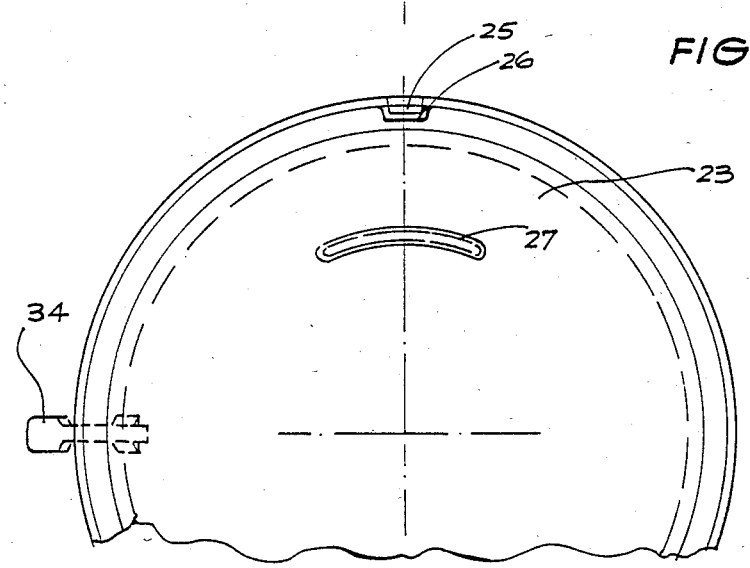
FIG. 2 is a partial plan view thereof.

On the small container 15 is a lid 23 which is shaped in the manner shown in FIG. 1 to promote the circulation of foodstuffs during processing as indicated by the arrow 24 in the left hand side of the smaller container 15. The lid 23 is prevented from rotating in relation to the small container 15 by means of a key 25 in the latter fitting into a notch 26 in the lid 23 (FIG. 2).

The lid 23 is held in position by the lid 11 of the container 10 as shown and the lid 23 is prevented from rotation by means of the curved ridge 27 which extends up into the tube 12 and makes close contact with the wall thereof.

A stainless steel insert 28 is provided in the lid 23 and a corresponding insert 29 in the tool 21, the object of these inserts being that should the tool tend to rise during food processing the load is transferred via the two stainless steel inserts.

The small container 15 is provided with a handle 34 at one side. This however is an optional feature and is in no way essential.

When it is desired to process a small quantity of foodstuff a container 15 is set in place in the food processor and the tool 21 inserted. It is then covered by a lid 23 which is held in place by the lid 11. Food processing is then carried out in the normal manner. When this has been done the small container may be removed from the container 10, the food processing tool extracted from it and the contents either used or stored by means of the storage lid 31 shown in FIG. 4 which frictionally engages a flange 32 on the small container 15 and which itself is provided with an annular flange 33 which frictionally engages the upper end of the sleeve 16.

Figure 3:
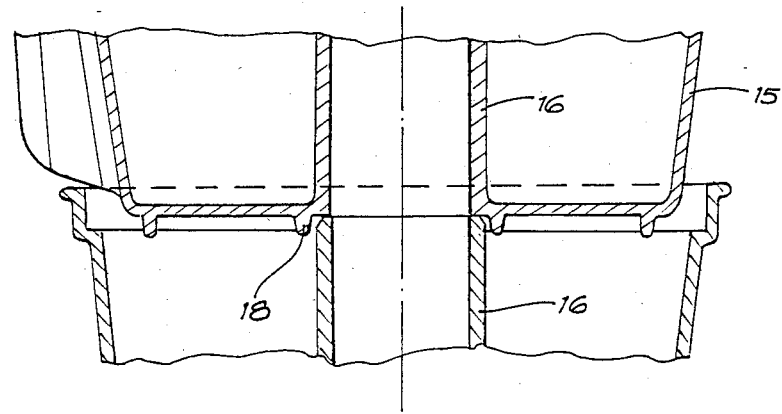
FIG. 3 illustrates the manner in which small containers according to the invention may be stacked.
Figure 4:
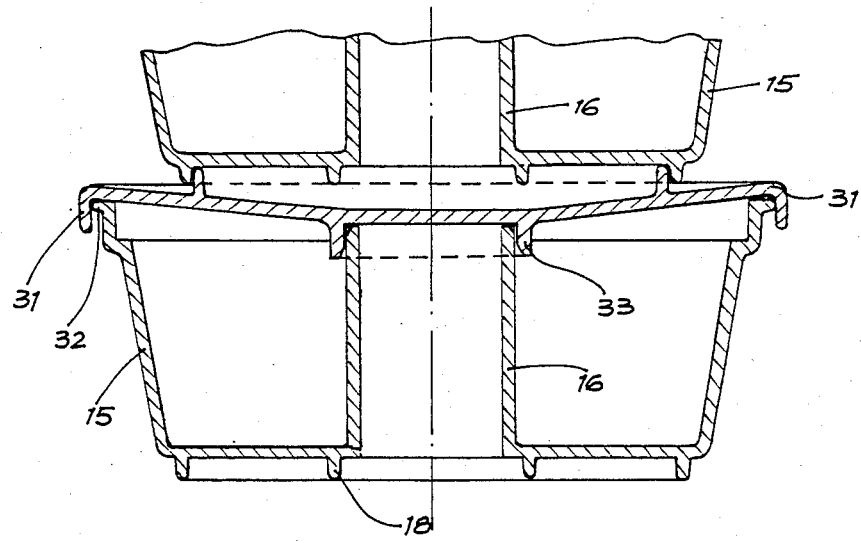
FIG. 4 shows the manner in which a storage lid may be attached to a small container according to the invention.

FIGS. 3 and 4 illustrate how containers 15 may be stacked either without a lid as shown in FIG. 3 or with a lid as shown in FIG. 4. In practice a plurality of containers 15 together with one tool such as 21 and a lid 23 would be provided for use in connection with a food processor to enable a number of different foodstuffs to be processed and stored.

The embodiment of the invention described above is given by way of example only as constituting a preferred form of the invention defined broadly above in the succeeding claims.

I claim:

1. A food processor, comprising a base having an upper surface; electric driving means; a first substantially cylindrical food processing container having an open upper end, an upper part and a bottom with a hole; a first lid which is provided so as to removably close said upper end of said first container; means for removably attaching said first container to said upper surface of said base so that said electric driving means projects through said bottom hole of said first container; a first sleeve provided in said first container so as to surround said bottom hole and project upwardly to form a first annular liquid containing well; a second smaller container located in said upper part of said first container, and having a substantially smaller volumetric capacity than said first container and a base with a hole therein; a second sleeve provided in said second container so as to surround said base hole and project upwardly to form a second annular liquid containing well; a food processing tool provided in said second container so as to process food placed therein; means for drivably connecting said tool to said electric drive means; and a second lid closely fittable on said second container, said first and second lids being formed as separate lids which can be removed from and fitted onto the respective containers independently of one another.

2. A food processor as defined in claim 1, wherein said second container is mounted on and supported by said first sleeve in said first container.

3. A food processor as defined in claim 1, wherein said second lid of said second container is held securely in said second container by said first lid of said first container.

4. A food processor as defined in claim 1, and further comprising means for preventing rotation of said first lid of said first container relative to said second lid of said second container.

5. A food processor as defined in claim 4, wherein said rotation preventing means includes a hollow tube having a wall and being provided on said first lid, and a curved ridge provided on said second lid so as to extend upwardly into said tube and make contact with said wall.

6. A food processor as defined in claim 1, wherein said electric driving means includes a driving shaft, said driving shaft projecting through said bottom hole of said first container and being connected to said food processing tool.

7. A food processor as defined in claim 1, and further comprising a handle provided on said second container.

8. A food processor as defined in claim 1, wherein said second container has an upper edge provided with a flange, and a second sleeve having an upper end; and further comprising a storage lid engageable over said flange of said second container, and having an annular flange frictionally engageable with said upper end of said second sleeve.

9. A food processor as defined in claim 1, wherein said second lid is formed so as to promote circulation of food during processing.

10. A food processor as defined in claim 1, and further comprising means for preventing said second lid from rotating in relation to said second container.

11. A food processor as defined in claim 1, and further comprising means provided in said first lid and said second lid for transferring a load generated during food processing caused by a tendency of said tool to rise.

* * * * *